United States Patent
Shankar et al.

(10) Patent No.: US 9,535,963 B1
(45) Date of Patent: *Jan. 3, 2017

(54) GRAPH-BASED QUERIES

(71) Applicant: LinkedIn Corporation, Mountain View, CA (US)

(72) Inventors: Srinath Shankar, Mountain View, CA (US); Robert W. Stephenson, Sunnyvale, CA (US); Andrew J. Carter, Mountain View, CA (US); Maverick Shu-Bun Lee, Mountain View, CA (US); Scott M. Meyer, Berkeley, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,178

(22) Filed: Sep. 18, 2015

(51) Int. Cl.
*G06F 17/30* (2006.01)

(52) U.S. Cl.
CPC ... *G06F 17/30554* (2013.01); *G06F 17/30277* (2013.01); *G06F 17/30404* (2013.01); *G06F 17/30424* (2013.01); *G06F 17/30477* (2013.01); *G06F 17/30589* (2013.01); *G06F 17/30595* (2013.01); *G06F 17/30702* (2013.01); *G06F 17/30731* (2013.01); *G06F 17/30958* (2013.01)

(58) Field of Classification Search
CPC .................. G06F 17/30277; G06F 17/30424; G06F 17/30427; G06F 17/30587
USPC .................................................. 707/803, 760
See application file for complete search history.

(56) References Cited

U.S. PATENT DOCUMENTS

| | | |
|---|---|---|
| 8,185,558 B1 | 5/2012 | Narayanan |
| 8,533,182 B1 | 9/2013 | Charboneau |
| 8,736,612 B1 | 5/2014 | Goldman |
| 9,378,303 B1 | 6/2016 | Shankar |
| 2003/0084043 A1 | 5/2003 | Acharya |
| 2007/0192306 A1 | 8/2007 | Papakonstantinou |
| 2007/0239694 A1 | 10/2007 | Singh |
| 2008/0116449 A1 | 5/2008 | Macready |
| 2008/0306910 A1 | 12/2008 | Singh |
| 2009/0132503 A1 | 5/2009 | Sun |
| 2009/0240649 A1 | 9/2009 | Sereni |
| 2009/0240682 A1 | 9/2009 | Balmin |
| 2011/0270861 A1 | 11/2011 | Arshavsky |
| 2012/0005224 A1 | 1/2012 | Ahrens |
| 2012/0047114 A1* | 2/2012 | Duan ................ G06F 17/30448 707/694 |

(Continued)

FOREIGN PATENT DOCUMENTS

EP 2937797 10/2015

*Primary Examiner* — Thu-Nguyet Le
(74) *Attorney, Agent, or Firm* — Park, Vaughan, Fleming & Dowler LLP

(57) ABSTRACT

In order to request desired information from a graph database, a system executes a query against the graph database. The graph database may store a graph that includes nodes, edges between the nodes, and predicates to represent and store data with index-free adjacency. Moreover, the query may identify a first edge associated with a predicate that specifies one or more of the nodes in the graph. In response to the query, the system receives a result that includes a subset of the graph. In particular, the subset of the graph may include the desired information expressed within an associated structure of the graph.

20 Claims, 15 Drawing Sheets

(56) References Cited

U.S. PATENT DOCUMENTS

| | | | |
|---|---|---|---|
| 2012/0096043 A1* | 4/2012 | Stevens, Jr. | G06F 17/30958 |
| | | | 707/798 |
| 2012/0136884 A1 | 5/2012 | Kanawa | |
| 2012/0179644 A1 | 7/2012 | Miranker | |
| 2012/0284255 A1* | 11/2012 | Schechter | G06F 17/30398 |
| | | | 707/718 |
| 2013/0097180 A1 | 4/2013 | Tsent | |
| 2014/0172914 A1 | 6/2014 | Elnikety et al. | |
| 2014/0201234 A1 | 7/2014 | Lee et al. | |
| 2014/0280044 A1 | 9/2014 | Huynh et al. | |
| 2014/0310302 A1 | 10/2014 | Wu | |
| 2014/0330867 A1* | 11/2014 | Sarkar | G06F 17/30958 |
| | | | 707/772 |
| 2014/0337373 A1 | 11/2014 | Morsi | |
| 2015/0026158 A1 | 1/2015 | Jin | |
| 2015/0120717 A1 | 4/2015 | Kim | |
| 2015/0120775 A1 | 4/2015 | Shao | |
| 2015/0127677 A1 | 5/2015 | Wang | |
| 2015/0134637 A1 | 5/2015 | Pall | |
| 2015/0302300 A1* | 10/2015 | Fletcher | G06N 5/04 |
| | | | 706/11 |
| 2016/0171540 A1 | 6/2016 | Mangipudi | |

* cited by examiner

GRAPH-BASED QUERIES

BACKGROUND

Field

The described embodiments relate to techniques for performing a query of a database. More specifically, the described embodiments relate to techniques for performing a query of a graph database.

Related Art

Data associated with applications is often organized and stored in databases. For example, in a relational database data is organized based on a relational model into one or more tables of rows and columns, in which the rows represent instances of types of data entities and the columns represent associated values. Information can be extracted from a relational database using queries expressed in a Structured Query Language (SQL).

In principle, by linking or associating the rows in different tables, complicated relationships can be represented in a relational database. In practice, extracting such complicated relationships usually entails performing a set of queries and then determining the intersection of or joining the results. In general, by leveraging knowledge of the underlying relational model, the set of queries can be identified and then performed in an optimal manner.

However, applications often do not know the relational model in a relational database. Instead, from an application perspective, data is usually viewed as a hierarchy of objects in memory with associated pointers. Consequently, many applications generate queries in a piecemeal manner, which can make it difficult to identify or perform a set of queries on a relational database in an optimal manner. This can degrade performance and the user experience when using applications.

A variety of approaches have been used in an attempt to address this problem, including using an object-relational mapper, so that an application effectively has an understanding or knowledge about the relational model in a relational database. However, it is often difficult to generate and to maintain the object-relational mapper, especially for large, real-time applications.

Alternatively, a key-value store (such as a NoSQL database) may be used instead of a relational database. A key-value store may include a collection of objects or records and associated fields with values of the records. Data in a key-value store may be stored or retrieved using a key that uniquely identifies a record. By avoiding the use of a predefined relational model, a key-value store may allow applications to access data as objects in memory with associated pointers, i.e., in a manner consistent with the application's perspective. However, the absence of a relational model means that it can be difficult to optimize a key-value store. Consequently, it can also be difficult to extract complicated relationships from a key-value store (e.g., it may require multiple queries), which can also degrade performance and the user experience when using applications.

Figure 1:
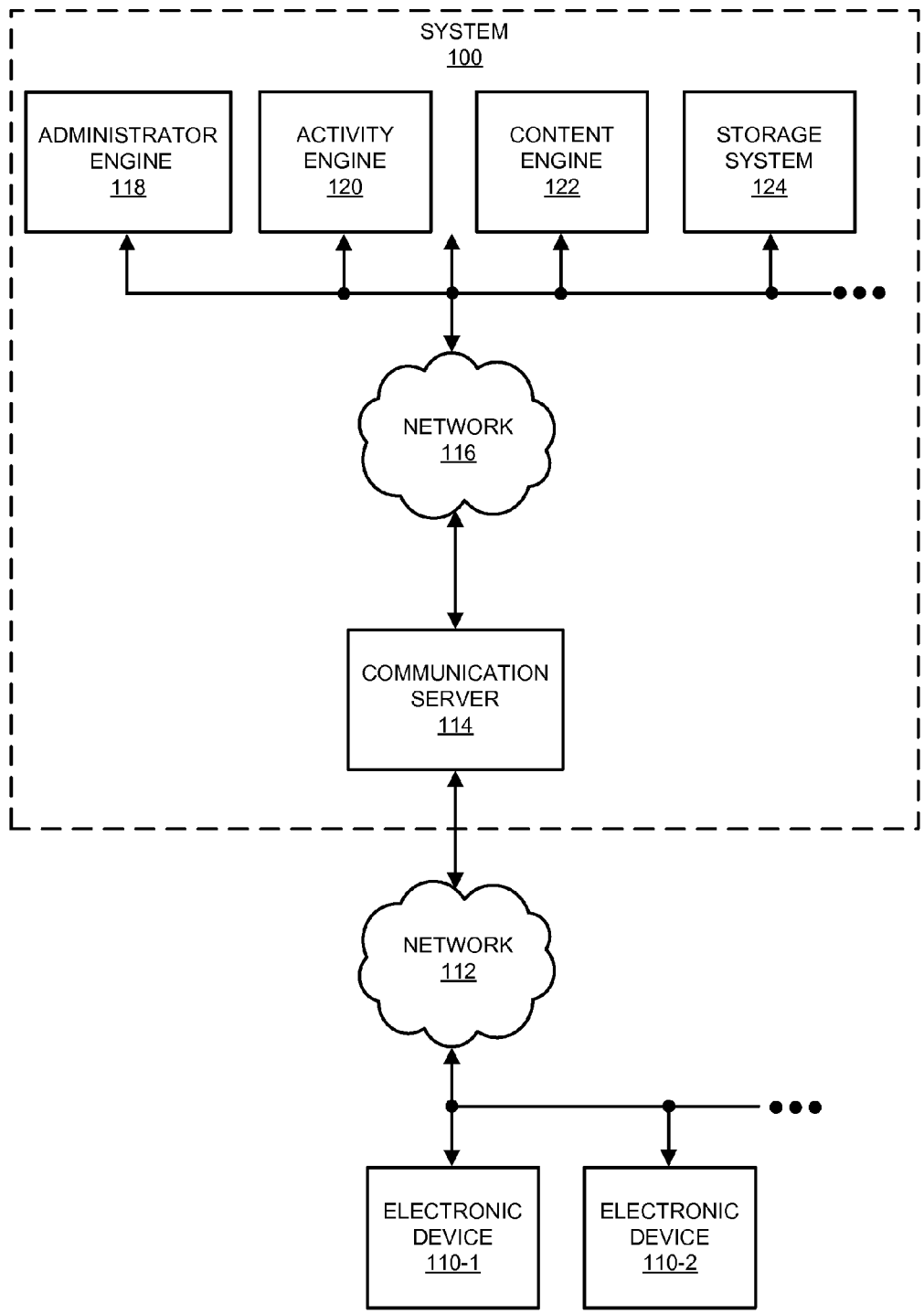
FIG. 1 is a block diagram illustrating a system in accordance with an embodiment of the present disclosure.

Table 1 provides an edge query in accordance with an embodiment of the present disclosure.

Table 2 provides data in JavaScript Object Notation (JSON) in accordance with an embodiment of the present disclosure.

Table 3 provides an edge query in accordance with an embodiment of the present disclosure.

Table 4 provides a result for an edge query in accordance with an embodiment of the present disclosure.

Table 5 provides a set of commands that defines a compound relationship in accordance with an embodiment of the present disclosure.

Table 6 provides a set of commands that defines a compound relationship in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In order to request desired information from a graph database, a system executes a query (which is sometimes referred to as an 'edge query') against the graph database. The graph database may store a graph that includes nodes, edges between the nodes, and predicates to represent and store data with index-free adjacency. Moreover, the query may identify a first edge associated with a predicate that specifies one or more of the nodes in the graph. In response to the query, the system receives a result that includes a subset of the graph. In particular, the subset of the graph typically must include the desired information expressed within an associated structure of the graph.

Furthermore, the result of the query may be used in a concatenated or sequential set of queries. In particular, the system may execute a second query against the subset of the graph received in response to the original query. This second query may identify a second edge associated with a second predicate that specifies one or more of the nodes. Then, in response to the second query, the system may receive a second result that includes a second subset of the graph.

Additionally, the system may verify a subset of the graph returned in response to a query. In particular, the system may verify that the subset of the graph includes one or more particular edges, such as an edge corresponding to a predicate in the query. More generally, the system may verify that the subset of the graph includes data and/or associated structure in the portion of the graph.

In order to facilitate the requesting of desired information from the graph database, the system may translate an initial query into a query that can be executed against the graph database. In particular, using primitives, the system may translate the initial query associated with a type of database other than the graph database (such as a relational database) into the query. Note that the primitives may include a rule based on the edges in the graph that expresses a relational schema or model in the type of database, and information associated with a compound key that specifies a relationship between the nodes, the edges and the predicates in the graph corresponding to a table in the type of database.

Moreover, in order to facilitate efficient storage and extraction of data, the system may represent a compound relationship in the graph stored in the graph database. In particular, the system (or a user) may define the compound relationship based on two or more of the predicates associated with two or more of the edges between two or more of the nodes in the graph. Then, the system may generate, in the graph, a hub node that corresponds to the compound relationship and that is hidden from users of the graph so that the identifier of the hub node is not visible external to the graph database. Note that the identifier of the hub node may be specified in the query using the two or more predicates, thereby allowing data associated with the compound relationship to be readily identified, modified and/or extracted.

In this way, this graph-storage technique may allow information associated with complicated relationships to be efficiently extracted from the graph database. In particular, instead of performing multiple queries, storing intermediate results in a data store, and then joining the intermediate results to obtain the desired information, the results of queries performed on the graph database may provide the desired information without joining. Consequently, the graph-storage technique may reduce the computation time and memory requirements needed for a computer system to extract the desired information from the graph database for an application relative to other types of databases, such as a relational database or a key-value store. Moreover, the graph-storage technique may improve the performance of applications that use the graph database without changing the manner in which the applications access data in the graph database (i.e., by viewing data as a hierarchy of objects in memory with associated pointers). Furthermore, the improved performance of the applications may also improve the user experience when using the applications.

In the discussion that follows, an individual or a user may be a person (for example, an existing user of a social network or a new user of a social network). Also, or instead, the graph-storage technique may be used by any type of organization, such as a business, which should be understood to include for-profit corporations, non-profit corporations, groups (or cohorts) of individuals, sole proprietorships, government agencies, partnerships, etc.

We now describe embodiments of the system and its use. FIG. 1 presents a block diagram illustrating a system 100 that performs a graph-storage technique. In this system, users of electronic devices 110 may use a service that is, at least in part, provided using one or more software products or applications executing in system 100. As described further below, the applications may be executed by engines in system 100.

Moreover, the service may, at least in part, be provided using instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

A wide variety of services may be provided using system 100. In the discussion that follows, a social network (and, more generally, a network of users), such as a professional social network, which facilitates interactions among the users, is used as an illustrative example. Moreover, using one of electronic devices 110 (such as electronic device 110-1) as an illustrative example, a user of an electronic device may use the software application and one or more of the applications executed by engines in system 100 to interact with other users in the social network. For example, administrator engine 118 may handle user accounts and user profiles, activity engine 120 may track and aggregate user behaviors over time in the social network, content engine 122 may receive user-provided content (audio, video, text, graphics, multimedia content, verbal, written, and/or recorded information) and may provide documents (such as presentations, spreadsheets, word-processing documents, web pages, etc.) to users, and storage system 124 may maintain data structures in a computer-readable memory that may encompass multiple devices, i.e., a large-scale storage system.

Note that each of the users of the social network may have an associated user profile that includes personal and professional characteristics and experiences, which are sometimes collectively referred to as 'attributes' or 'characteristics.' For example, a user profile may include: demographic information (such as age and gender), geographic location, work industry for a current employer, an employment start date, an optional employment end date, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections. However, as described further below, the nodes in the graph stored in the graph database may correspond to additional or different information than the members of the social network (such as users, companies, etc.). For example, the nodes may correspond to attributes, properties or characteristics of the users.

As noted previously, it may be difficult for the applications to store and retrieve data in existing databases in storage system 124 because the applications may not have access to the relational model associated with a particular relational database (which is sometimes referred to as an 'object-relational impedance mismatch'). Moreover, if the applications treat a relational database or key-value store as a hierarchy of objects in memory with associated pointers, queries executed against the existing databases may not be performed in an optimal manner. For example, when an application requests data associated with a complicated relationship (which may involve two or more edges, and which is sometimes referred to as a 'compound relationship'), a set of queries may be performed and then linking or joining the results. To illustrate this problem, rendering a web page for a blog may involve a first query for the three-most-recent blog posts, a second query for any associated comments, and a third query for information regarding the authors of the comments. Because the set of queries may be suboptimal, obtaining the results may, therefore, be time-consuming. This degraded performance may, in turn, degrade the user experience when using the applications and/or the social network.

In order to address these problems, storage system 124 may include a graph database that stores a graph (e.g., as part of an information-storage-and-retrieval system or engine). Note that the graph may allow an arbitrarily accurate data model to be obtained for data that involves fast joining (such as for a complicated relationship with skew or large 'fan-out' in storage system 124), which approximates the speed of a pointer to a memory location (and thus may be well suited to the approach used by applications).

Figure 2:
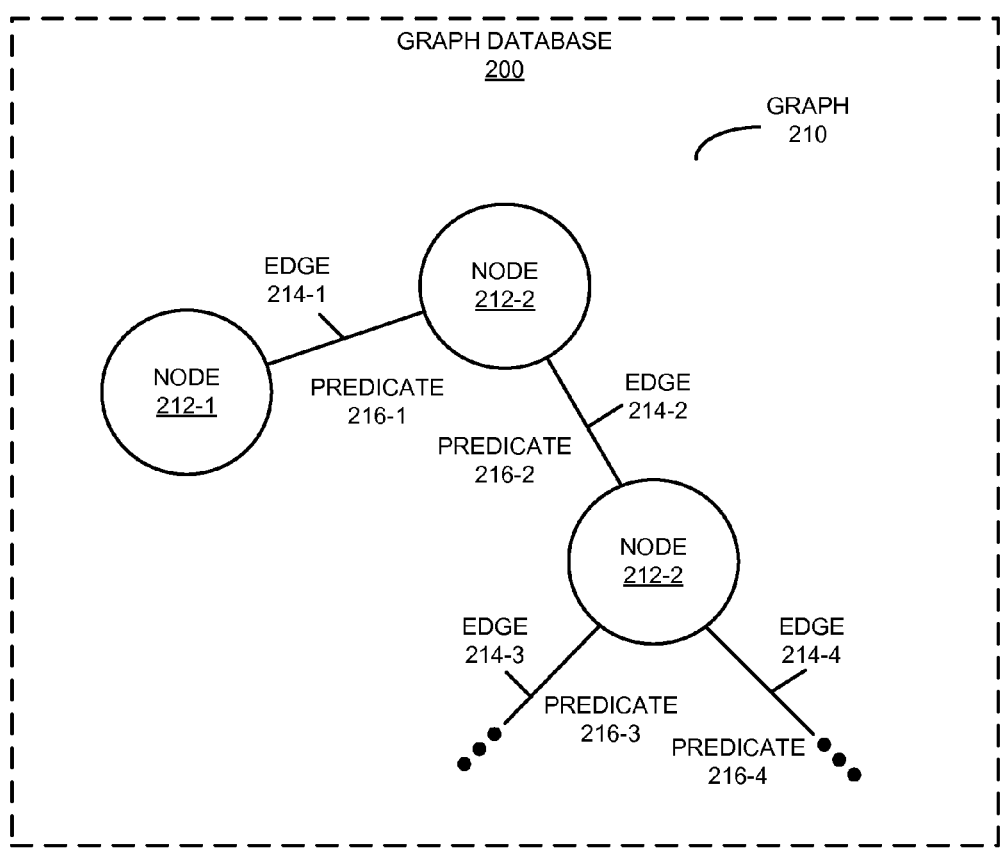
FIG. 2 is a block diagram illustrating a graph in a graph database in the system of FIG. 1 in accordance with an embodiment of the present disclosure.

FIG. 2 presents a block diagram illustrating a graph 210 stored in a graph database 200 in system 100 (FIG. 1). Graph 210 may include nodes 212, edges 214 between nodes 212, and predicates 216 (which are primary keys that specify or label edges 214) to represent and store the data with index-free adjacency, i.e., so that each node 212 in graph 210 includes a direct edge to its adjacent nodes without using an index lookup.

Note that graph database 200 may be an implementation of a relational model with constant-time navigation, i.e., independent of the size N, as opposed to varying as log(N). Moreover, all the relationships in graph database 200 may be first class (i.e., equal). In contrast, in a relational database, rows in a table may be first class, but a relationship that involves joining tables may be second class. Furthermore, a schema change in graph database 200 (such as the equivalent to adding or deleting a column in a relational database) may be performed with constant time (in a relational database, changing the schema can be problematic because it is often embedded in associated applications). Additionally, for graph database 200, the result of a query may be a subset of graph 210 that preserves intact the structure (i.e., nodes, edges) of the subset of graph 210.

The graph-storage technique may include embodiments of methods that allow the data associated with the applications and/or the social network to be efficiently stored and retrieved from graph database 200. For example, as described below with reference to FIGS. 3 and 4, the graph-storage technique may obtain provide a subset of graph 210 in response to a query. Moreover, as described below with reference to FIGS. 5 and 6, the results of a query may be used in concatenated or sequential queries. In particular, instead of independently applying a first query and a second query to graph database 200, the second query may be applied to the results of the first query (which include a subset of graph 210). In this way, complicated relationships can be obtained directly without subsequent joining or linking of intermediate results, thereby reducing the time needed to obtain desired information and the system resources used to obtain the desired information.

Figure 7:
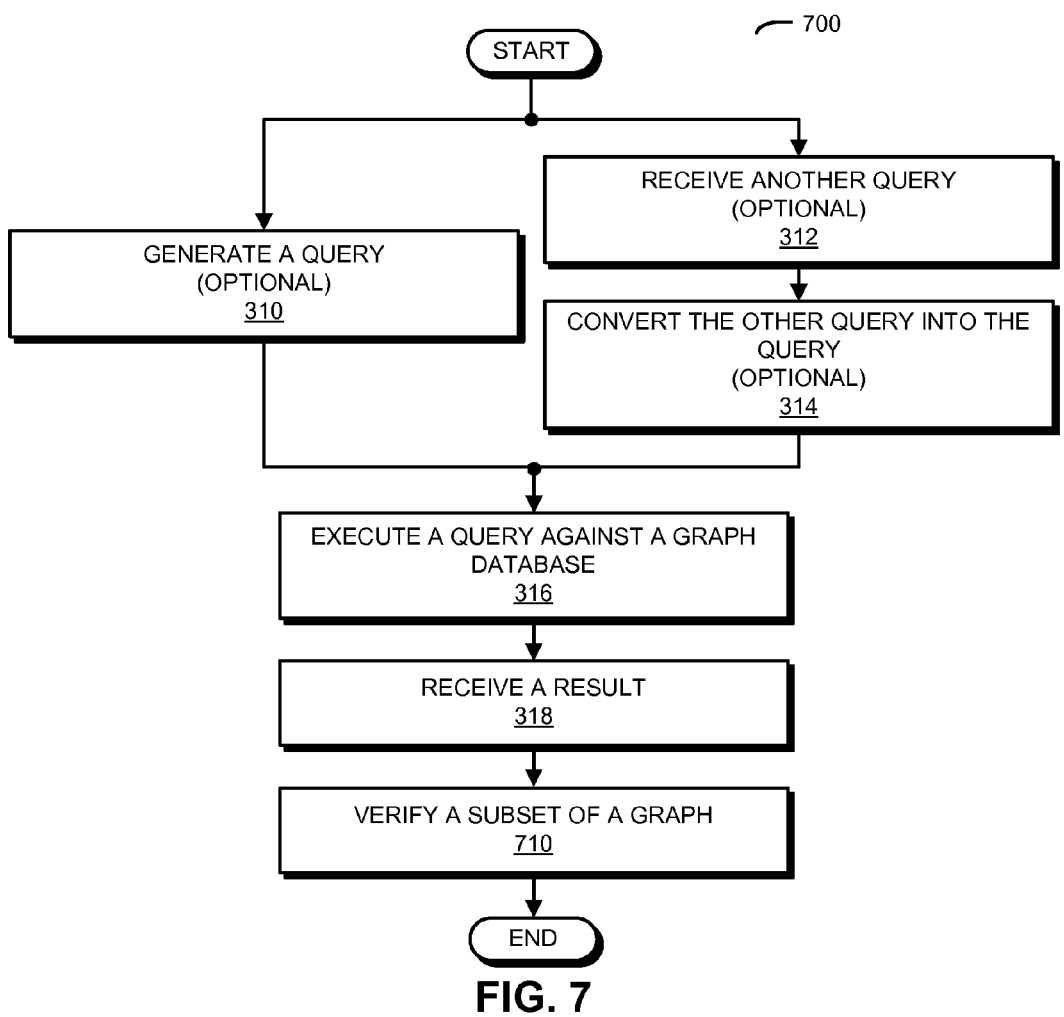
FIG. 7 is a flow chart illustrating a method for requesting desired information from a graph database in accordance with an embodiment of the present disclosure.
Figure 8:
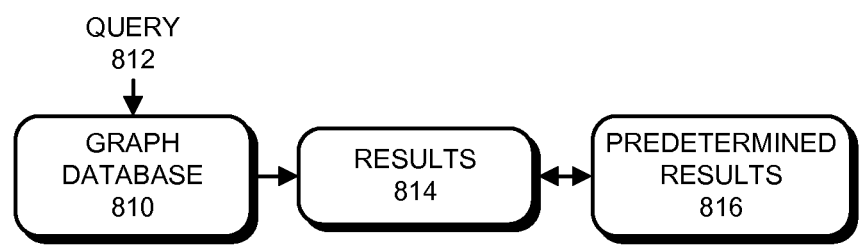
FIG. 8 is a drawing illustrating verification of query results in accordance with an embodiment of the present disclosure.

Furthermore, as described below with reference to FIGS. 7 and 8, the results of a query executed against graph database 200 may be verified by comparing the results with known or expected information. For example, because the results of a query include a subset of graph 210, they can be verified based on a predefined structure of graph 210 or particular information in the subset, such as edges or predicates that match those in the query.

Figure 9:
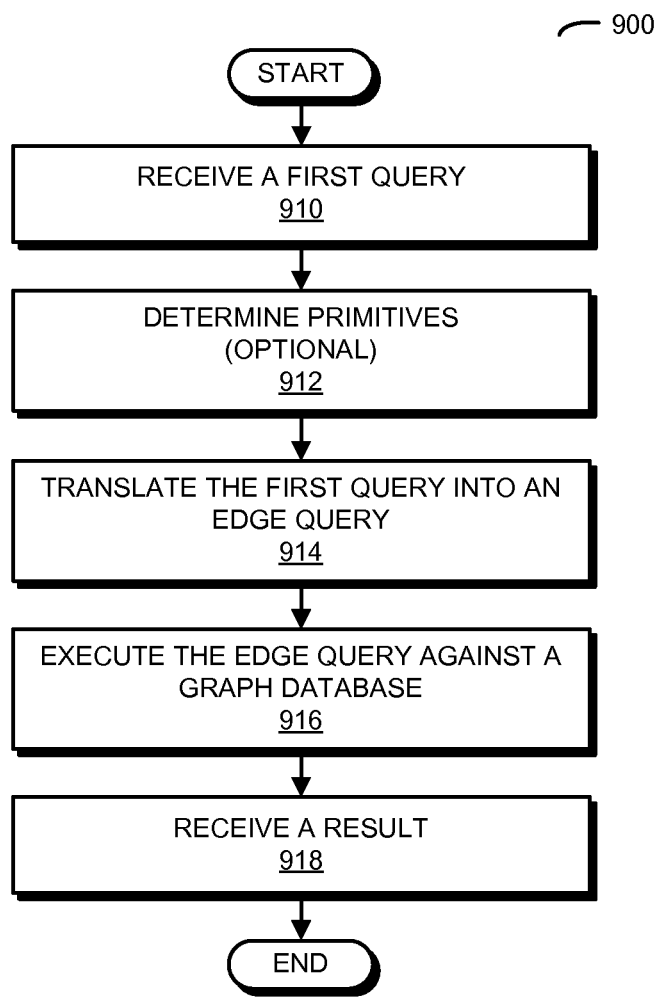
FIG. 9 is a flow chart illustrating a method for translating a first query into an edge query in accordance with an embodiment of the present disclosure.
Figure 10:
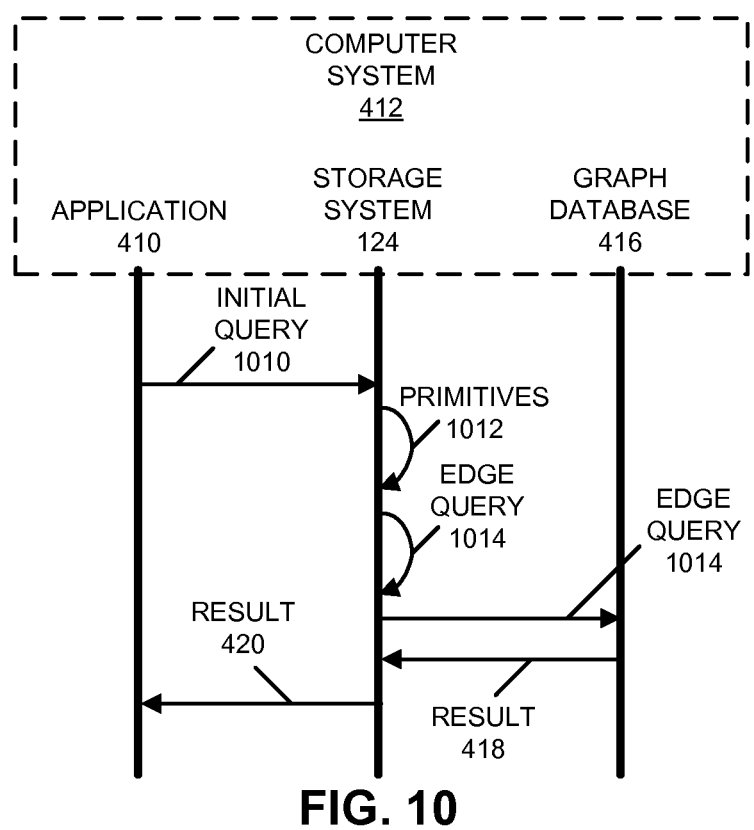
FIG. 10 is a drawing illustrating interaction with a graph database in the system of FIG. 1 in accordance with an embodiment of the present disclosure.
Figure 11:
FIG. 11 is a drawing illustrating translation of a first query into an edge query in accordance with an embodiment of the present disclosure.

In some embodiments, as described below with reference to FIGS. 9-11, a query that is associated with another type of database or that is in a different language than that associated with graph database 200 (such as JavaScript Object Notation or JSON) may be translated into the edge-based format that is used with graph database 200 prior to executing the query against graph database 200. In addition, as described below with reference to FIGS. 12-14, complicated relationships may be represented in graph database 200 by defining a compound relationship in graph 210 that includes an identifier of a hub node that is hidden from a user of graph database 200. For example, the identifier of the hub node may not be visible external to graph database 200. Instead, the identifier of the hub node (and, thus, the compound relationship) may be specified or identified based on two or more edges that can be included in a query.

Referring back to FIG. 1, the graph-storage techniques described herein may allow system 100 to efficiently and quickly (e.g., optimally) store and retrieve data associated with the applications and the social network without requiring the applications to have knowledge of a relational model implemented in graph database 200. Consequently, the graph-storage techniques may improve the availability and the performance or functioning of the applications, the social network and system 100, which may reduce user frustration and which may improve the user experience. Therefore, the graph-storage techniques may increase engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
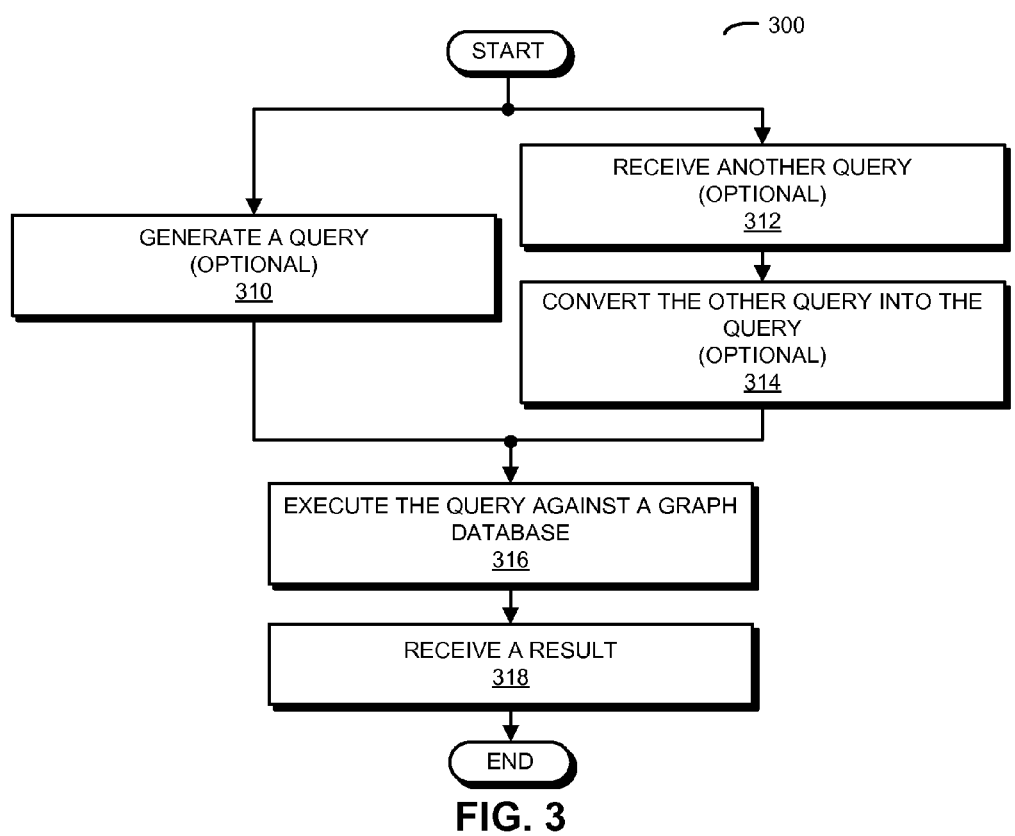
FIG. 3 is a flow chart illustrating a method for requesting desired information from a graph database in accordance with an embodiment of the present disclosure.

We now describe embodiments of the graph-storage technique. FIG. 3 presents a flow chart illustrating a method 300 for requesting desired information from a graph database, which may be performed by a computer system (such as system 100 in FIG. 1 or computer system 1500 in FIG. 15). During operation, the computer system executes a query against the graph database (operation 316) storing a graph. Note that the graph may include nodes, edges between the nodes, and predicates to represent and store data with index-free adjacency. Moreover, the query may identify a first edge associated with a predicate that specifies one or more of the nodes in the graph. Then, the computer system receives a result (operation 318) in response to the query, where the result includes a subset of the graph. Note that the desired information may be expressed within an associated structure of the graph and/or the result may exclude hierarchical constraints and relational constraints.

Furthermore, the computer system may optionally generate the query (operation 310) with a subject, a predicate and an object based on the desired information. For example, the query may be associated with entities in a professional network.

Alternatively, the computer system may optionally receive another query (operation 312), and the computer system may convert the other query into the query (operation 314). For example, the other query may be compatible with a type of database that has a different data model and/or that is different from the graph database (such as a relational database and/or a hierarchical database). In some embodiments, the other query is compatible with JSON.

Figure 4:
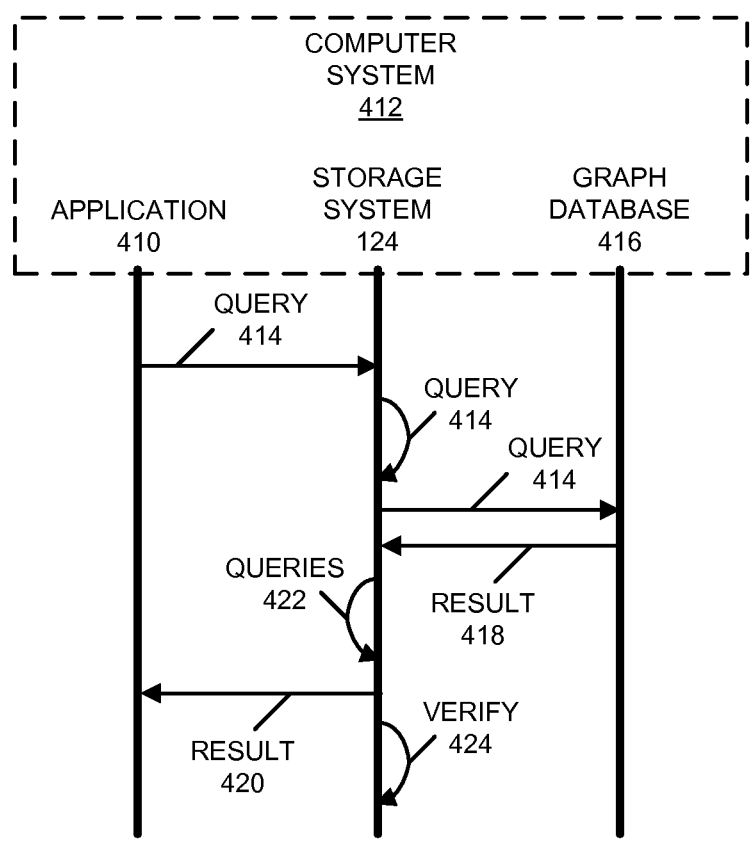
FIG. 4 is a drawing illustrating interaction with a graph database in the system of FIG. 1 in accordance with an embodiment of the present disclosure.

In an exemplary embodiment, method 300 is implemented using one or more applications and a storage system (or engine) in the computer system that interact with each other. This is illustrated in FIG. 4. During this method, an application 410 executing in computer system 412 (which may implement some or all of the functionality of system 100 in FIG. 1) may provide a query 414 to storage subsystem 124. Alternatively, storage subsystem 124 may generate query 414 (e.g., based on desired information requested by application 410) or may translate an initial query received from application 410 (which may be in a different language that is not compatible with graph database 416) into query 414 (which is an edge query that is compatible with graph database 416). In particular, the initial query may be associated with a different data model and may not be executable against graph database 416 until it is translated into query 414.

Then, storage subsystem 124 may execute query 414 against graph database 416 to obtain result 418 (which may include a subset of a graph stored in graph database 416). Next, storage subsystem 124 may provide result 420 (which may be the same as result 418 or a portion of result 418) to application 410.

In an exemplary embodiment, the graph database has a schema that represents edges using triples (subject, predicate, object) that specify first-class relations. The use of a triple as the fundamental relation in the data provides meaning that can be directly consumed by a human being. In some embodiments, a quad is used to capture/represent additional information, such as ownership or provenance. However, in other embodiments a variable length relation is used in the graph.

Note that each field in a triple may have an associated integer 'entity identifier.' This edge structure may allow joining to occur in the domain of integers, specifically sets of integers as marshalled by an inverted index. Moreover, this domain may allow succinct representation and a fast join implementation. Furthermore, the triples may be mapped into structure hierarchies, such as JSON or HyperText Markup Language (HTML) templates that are often used in the upper reaches of the stack. Thus, query results may be converted in JSON.

In the graph database, there may not be a separate notion of an 'attribute.' Instead, two different edge types may be represented by two different triples having a common intermediate node. For example, a member-to-member connection between members 1234 and 4567 in the social network may be represented as Edge(x, left_member', 'member/1234'), Edge(x, left_score', 6.7), Edge(x, 'right_member', 'member/4567'), Edge(x, 'right_score', 23.78) and Edge(x, 'creation_date', '2014-sep-26'), where 'x' indicates the intermediate node. Note that data formerly known as 'attributes' may exist as triples that are separately updatable, fully indexed, and queryable without additional complexity. As with other predicates, predicates used as attributes may be created on demand.

The physical storage for the graph and the indexes may be log structured and may be mapped directly to memory. Nodes and edges may be identified by their offset in the physical log. This log structure may create a natural virtual time that can be exploited for consistency, and that may allow unrestricted parallel access to physical data and indexes for join performance.

As noted previously, edges may be accessible by inverted indexes. For example, 'iSub(1234)' may yield a set of integer node identifiers and log offsets of the edge(s) whose subject is '1234.' Inverted indexes with pre-computed subject-predicate and object-predicate intersections may allow constant-time navigation, which consists of a hash-table lookup to get a set of edges followed by an array access to navigate across each edge.

Note that the inverted indexes may be 'normalized' in the sense that they may not include copies of any of the data that they index. Thus, the schema for an inverted index may include a mapping from a subject identifier to a set of edge identifiers (S→{I}), a mapping from a predicate identifier to a set of edge identifiers (P→{I}), a mapping from an object identifier to a set of edge identifiers (O→{I}), a mapping from a subject identifier and a predicate identifier to a set of edge identifiers (S,P→{I}), and a mapping from an object identifier and a predicate identifier to a set of edge identifiers (O,P→{I}). Moreover, the set of edge identifiers may in turn specify the triple (I[i]→{S:s, P:p, O:o}).

Furthermore, using a 3-level memory hierarchy, de-normalization (i.e., copying parts of the edge into the indexes) can result in faster execution and a smaller memory footprint (S→{P,O}, P→{S,O}, O→{P,S}, S,P→{O} and O,P→{S}). This approach may be equivalent to a posting list. Note that the index may not need to include the edges at all. In some embodiments, this approach may be extended further so that S→P→{O},P→S→{O},P→O→{S} and O→P→{S}. Thus, there may be two predicate indexes, one forward from S to O and another in reverse. In principle, all six permutations may be need, but in practice for most queries four may be sufficient.

In some embodiments of de-normalization, graphs are created for some or all entities in the social network (individual members, companies, etc.). In this example, a graph may include a complete neighborhood of first-order connections, with tens or even hundreds of thousands of edges. While this approach would duplicate a huge amount of data, there may not be a need for indexing. Instead, a single sequential scan of the edges may be stored in memory.

A graph may be larger than a single machine can store intact, so it may be split up into shards with a machine dedicated to each shard. In some embodiments, a hybrid sharding approach is used, in which a large index set is split across many machines to allow parallelism, while at the same time keeping small index sets together on a single machine so that query evaluation can make decisions based on a 'locally closed world.' For example, such a graph partitioning may have the entertainment industry in one shard, computer programmers in another, finance in another, and so forth. Conversely (because it is a large index set), for an influential member of a professional social network, such as Richard Branson, millions of follower edges may be spread across multiple shards.

By specifying that each shard is a database in its own right, and making an initial top-level query evaluator work with a federation of databases, flexibility in the sharding implementation may be obtained. In particular, federated query evaluation may start by offering the complete query to all shards with the expectation that each shard will return everything it knows about the result or the answer. Thus, responses may range from the complete answer to a set of member-to-member links in the social network that may play a role in the result.

In some embodiments, the graph database (or databases) uses a static query plan. In these embodiments, an optimizer may inspect a query and, with the help of statistics from the data and indexes, produce a plan that is then executed. This static approach may work well when the overhead of starting or stopping execution is large (such as when data is streaming from a hard disk drive) and the data may be readily summarized using statistics.

However, because graph data stored in memory typically does not have these properties (it is usually never more than an L3 cache-miss from a processor, and skew is common), in some embodiments the graph database (or databases) uses dynamic query optimization. As shown in Table 1, a three-hop path 'a.b.c' may be embedded in a larger query q. Based on the indexes, the number of edges with predicates a, b, and c can be determined. Suppose that those are 400, 10 M, and 200 k edges, respectively. The evaluation may start with a. This may identify a set of candidates for x1 and x2, and these sets may be no larger than the number of edges, say 400 and 300, respectively. If there are 300 x2s, it may be reasonable to proceed with the b edges even though there are 10 M of those. For example, if b is 'place of birth,' there may be at most 300 candidates for x3. However, if b is something like 'follows,' then x2[0] may have 20 edges, x2[1] may have 243 edges, and x2[2] may have 5 M. With a static plan, there would be no choice other than grinding through all 5 M possibilities. Alternatively, a dynamic evaluator may defer processing the large fan-out as long as it remained more expensive than other alternatives, by either evaluating c or some other constraint in the ellipsis which might remove x2[2] from consideration.

TABLE 1 q(...) :-
...
Edge(x1, 'a', x2),
Edge(x2, 'b', x3),
Edge(x3, 'c', x4),
...

In an exemplary embodiment, an initial query from an application for data for a blog is in JSON. This is shown in Table 2, which shows a JSON query for blog posts sorted, descending, by date. As shown in Table 3, an initial query may be translated to or expressed as an edge query that is compatible with a graph database (such as an edge query expressed using Datalog or Prolog). In this edge query, keys from the initial query become predicates, such as 'text,' 'comments,' and 'author.' Moreover, the edge query may include a string (such as 'comment') and/or a variable (such as 'P' or 'C'). For example, the edge query may include syntax that specifies the date, order by date, a limit of three blog posts, etc. In Table 3, note that things to the left of ':-' are known as or are referred to as rules. In the edge-query format, multiple definitions of the same rule are disjunctions (ORs), and things separated by commas are conjunctions (ANDs).

TABLE 2

[{"node identifier" : "post 25"
"text": "This is my blog ..."
"comments": [{
"author":{
"name": "Joe"
"image": "http// ..."
...
}
"text": "I agree"

TABLE 3 q(...) :-
Edge(P, "comment", C)
Edge(C, "author", _ )
Edge(C, "Text", _ )
...

Table 4 shows results for an edge query, which include a group of edges in a subset of a graph, each of which is specified by a subject, a predicate and an object. Note that, in general, an edge query is a set of constraints that are to be applied to a database, and the output or result is a portion or a subset of a graph that meets the constraints (without hierarchical or relational constraints). Because the result includes the portion of the graph (with its associated structure), the result can be used without a schema or a knowledge of the relational model implemented in the graph database. For example, the query can be applied to the result (i.e., the output of the query), and the same result may will be obtained. Such a conjunctive query is typically not possible with a SQL query for a relational database.

TABLE 4

Edger("post 25", "text", "This is my blog ...")
Edge("post 25", "comments", "C1")
Edge("C1", "author", "Joe")
...

Figure 5:
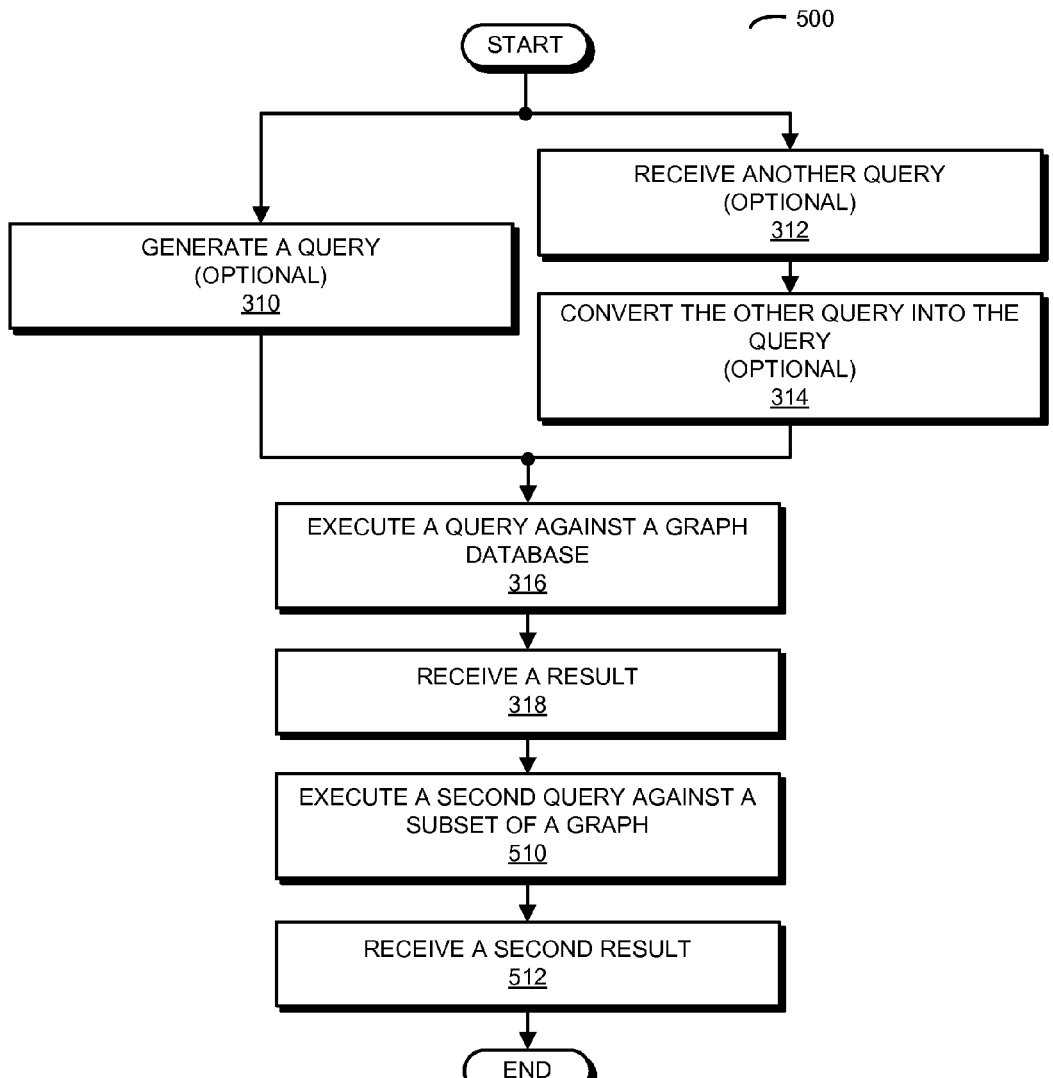
FIG. 5 is a flow chart illustrating a method for requesting desired information from a graph database in accordance with an embodiment of the present disclosure.

Because the output or result for a query includes a subset of the graph (without losing the associated structure), queries can be concatenated and applied to the preceding result instead of to the entire graph. This is shown in FIG. 5, which presents a flow chart illustrating a method 500 for requesting desired information from a graph database, which may be performed by a computer system (such as system 100 in FIG. 1 or computer system 1500 in FIG. 15). During operation, the computer system executes a query against the graph database (operation 316) storing a graph. Note that the graph may include nodes, edges between the nodes, and predicates to represent and store data with index-free adjacency. Moreover, the query may identify a first edge associated with a predicate that specifies one or more of the nodes in the graph. Then, the computer system receives a result (operation 318) in response to the query, where the result includes a subset of the graph.

Next, the computer system executes a second query against the subset of the graph (operation 510), where the second query identifies a second edge associated with a second predicate that specifies one or more of the nodes. Furthermore, the computer system receives a second result (operation 512) in response to the second query, where the second result includes a second subset of the graph. Note that executing the second query on the first subset of the graph may eliminate a need to execute the second query on the graph database.

Operations in method 500 may be repeated. For example, the computer system may execute one or more additional queries on the subset of the graph and/or may execute a third query on the second subset of the graph.

Note that the query in operation 316 may be generated by the computer system, or may be received and/or translated, as described previously with reference to FIG. 3.

Referring back to FIG. 4, prior to providing result 420, computer system 412 may perform one or more queries 422 on result 418 to obtain result 420.

Figure 6:
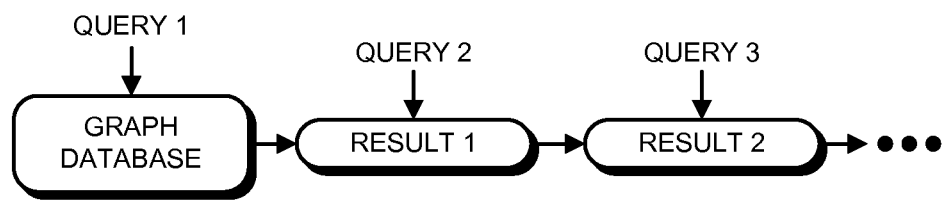
FIG. 6 is a drawing illustrating concatenated queries in accordance with an embodiment of the present disclosure.

By piping the results of one query to another query, a group of related queries can be performed efficiently (i.e., computationally faster) by defining a subquery that is common to the group. Concatenated queries are illustrated in FIG. 6. Note that such concatenated queries are typically not possible with queries executed against a relational database, because the relational model embodied or implemented in the relational database is not included in the results for these queries. (Stated differently, it is typically not possible to write a single query (e.g., in SQL) that returns multiple tables.) In contrast, because the result for an edge query is a subset of a graph and includes the associated structure, it can be piped into a subsequent query, which can decrease the time needed to extracted desired information from a graph database relative to the time need to extract this desired information from a relational database.

In an exemplary embodiment, a set of edge queries is used to identify movies in a graph database. While a simple look up of one table (such as looking up one row in a table) may be performed quickly (such as within 2 µs) using a SQL query of a relational database, as the number of joins in a complicated relationship (such as Oscar winning movies with particular actors) increases for a set of SQL queries, the time needed to obtain the desired result or information may grow rapidly.

In contrast, the time needed to obtain the desired information using a set of edge queries of a graph database may be independent of the number of edge queries (which correspond to the number of joins). For example, the time needed to obtain the desired information using one or more edge queries may be constant, such as 20 µs. Therefore, if the complicated relationship involves many joins of the results for a set of SQL queries (such as tens to hundreds of joins), the set of edge queries of a graph database may have superior performance (i.e., reduced time needed to obtain the desired information).

Furthermore, because the result of an edge query is a subset of a graph, the result can be verified to confirm that the edge query was performed correctly. This is shown in FIG. 7, which presents a flow chart illustrating a method 700 for requesting desired information from a graph database, which may be performed by a computer system (such as system 100 in FIG. 1 or computer system 1500 in FIG. 15). During operation, the computer system executes a query against the graph database (operation 316) storing a graph. Note that the graph may include nodes, edges between the nodes, and predicates to represent and store data with index-free adjacency. Moreover, the query may identify a first edge associated with a predicate that specifies one or more of the nodes in the graph. Then, the computer system receives a result (operation 318) in response to the query, where the result includes a subset of the graph.

Next, the computer system verifies the subset of the graph (operation 710). For example, the subset of the graph may be verified when the subset of the graph matches a corresponding portion of the graph. In particular, the verifying (operation 710) may involve the computer system comparing the subset of the graph with a predefined subset of the graph. Alternatively or additionally, the subset of the graph may be verified when the subset of the graph includes an expected subset of the edges (such as one or more edges or nodes associated with a particular predicate).

In some embodiments, the verifying (operation 710) involves the computer system: executing another query against the graph database; receiving another result in response to the query, where the other result includes another subset of the graph; and comparing the other subset of the graph with the subset of the graph. For example, the subset of the graph may be verified when there is a match between an overlapping portion of the subset of the graph and the other subset of the graph. Alternatively or additionally, the verifying (operation 710) involves the computer system: executing another query against the graph database; receiving another result in response to the query, where the result includes information corresponding to the subset of the edges (such as such as one or more edges or nodes associated with a particular predicate); and comparing the information and the subset of the edges.

Note that the query in operation 316 may be generated by the computer system, or may be received and/or translated, as described previously with reference to FIG. 3.

Referring back to FIG. 4, computer system 412 may verify 424 result 418 or 420. For example, based on a predicate in query 414, computer system 412 may verify that one or more expected edges or nodes are included in result 418 or result 420. The verification is further illustrated in FIG. 8. In particular, result 814 for query 812 of graph database 810 may be compared to predefined or predetermined result 816. Thus, if query 812 includes a predicate for a company, result 814 should include at least one employee of the company, and this can be verified by comparing result 814 to a list of employees of the company in predetermined result 816. More generally, if query 812 includes a predicate, verifying results 814 may involve looking for the presence of certain edges in results 816.

As discussed previously, the graph-storage technique may involve translation. This is shown in FIG. 9, which presents a flow chart illustrating a method 900 for translating a first query into an edge query, which may be performed by a computer system (such as system 100 in FIG. 1 or computer system 1500 in FIG. 15). During operation, the computer system receives the first query (operation 910) that is associated with a first type of database (e.g., a relational database, a hierarchical database or another type of database, such as a database compatible with SQL) and, more generally, that has another or a different data model. Then, the computer system translates, using primitives, the first query into the edge query (operation 914) that is associated with a graph database storing a graph.

Note that the first type of database has a different data model than the graph database and/or is different than the graph database (e.g., the first type of database may use SQL), and the graph comprises nodes, edges between the nodes, and predicates to represent and store data with index-free adjacency. Moreover, the primitives include: a rule based on edges in the graph that expresses a relational schema in the first type of database, and information associated with a compound key that specifies a relationship between the nodes, the edges and the predicates in the graph corresponding to a table in the first type of database. Further discussion is provided below regarding using primitives to translate a query into a form compatible with a graph database.

Next, the computer system executes the edge query against the graph database (operation 916), where the edge query identifies an edge associated with a predicate that specifies one or more of the nodes in the graph. Furthermore, the computer system receives a result (operation 918) in response to the edge query, where the result includes a subset of the graph.

For example, the edge query may be compatible with datalog. More generally, the edge query may be compatible with a query language that is declarative so that it expresses computational logic without expressing an associated control flow and may be complete so that an arbitrary computation is represented by the query language.

In some embodiments, the computer system optionally determines the primitives (operation 912).

In an exemplary embodiment, method 900 is implemented using one or more applications and a storage system (or engine) in the computer system that interact with each other. This is illustrated in FIG. 10. During this method, application 410 executing in computer system 412 may provide an initial query 1010 to storage subsystem 124. This initial query may be in a different language that is not compatible with graph database 416. Then, storage subsystem 124 (or an evaluator layer that feeds storage subsystem 124 edges or graphs) may translate initial query 1010 into edge query 1014 (which is compatible with graph database 416) using primitives 1012. Note that primitives 1012 may be predetermined or may be optionally determined by computer system 412.

Then, storage subsystem 124 may execute edge query 1014 against graph database 416 to obtain result 418 (which may include a subset of a graph stored in graph database 416). Next, storage subsystem 124 may provide result 420 (which may be the same as result 418 or a portion of result 418) to application 410.

In an exemplary embodiment, the edge query is translated from the initial query to a general purpose, declarative query language (i.e., one that indicates to the computer system a desired outcome without specifying how it should be achieved, so that it can be optimized). This query language may be based on or compatible with datalog. Moreover, the query language may be comparable to SQL in terms of expressiveness. Said differently, the query language may be complete, so that an arbitrary computation can be represented or expressed. The query language may have features such as: transformation, composition, and query by example.

Graph transformation may be an arbitrary function that takes a complicated graph and produces a simpler one. In general, there is a natural tension between people who curate data and people who use data for some purpose. Application developers typically want specific coarse-grained information (e.g., a member's current employer), but ease of curation often requires that only facts that do not change are recorded. If the current employer is stored directly, an open-ended curation liability may be created (i.e., checking the members' employment status). While curating is more feasible, it is also a more complicated employment relationship, involving an employee, an employer, start and end dates, promotions, etc., which do not change over time. The complicated graph that can result can then be transformed into the simpler structure desired by the user. A common example of graph transformation is distance badging. In particular, a two-hop relationship may be converted into a single 'badge' edge whose object is the ordinal '2.'

Graph composition allows users to build complicated queries by referring to simpler ones. Given that the underlying graph data is often rich and complicated, there may be a need to encapsulate queries for re-use. For example, a query for 'database industry veterans,' such as people with ten years of experience in the database industry, at least one promotion and endorsements for database-related skills from other people in the database industry, may be reusable in queries such as: 'most frequent graduate schools of database industry veterans,' 'conferences frequented by . . . ,' and 'Bay Area start-ups attracting . . . in the past year.'

In query by example, simple conjunctive queries that are common may be easily expressed by constructing an example of the sort of data one hopes to find more of. Note that in query by example a hierarchy of predicate names may be used. Moreover, query by example may provide a mechanism for high-level interaction with relational databases.

The query language in the graph-storage technique may allow the computer system to support many different initial queries (with different associated databases) without performing an optimization for each initial query language. Moreover, the graph-storage technique may involve the use of a simple kernel (or primitive-based) language-query compilation and evaluation compiler that expresses the initial query using primitives. The primitives may include a rule based on edges in the graph that expresses or imposes a relational schema in the first type of database. For example, the rule based on member-to-member relationships a to b and b to c may relate a, b and c. Furthermore, the primitives may include a compound key or information associated with a compound key that specifies a relationship between the nodes, the edges and the predicates in the graph corresponding to a table in the first type of database. (However, the use of a compound key may depend on the implementation. More generally, the user defines the compound relationship using the language primitives. Then, at an implementation layer, the database may generate the compound key to identify the compound relationship. Thus, the user of the system may not be aware of the existence of the compound key.) In particular, the table may include attributes corresponding to predicates. For example, the compound key may define one or more relationships between a node with edges to members and their attributes (such as start and end dates, scores that indicate how members are connected, etc.).

An initial or first query (such as an SQL query) may be converted into an edge query (such as a datalog-compatible query) using the primitives. For example, an SQL query may be associated with one or more tables having columns, and may be broken into union constituents (e.g., select * x, y, z U select * a, b, c), that reference the tables (e.g., the columns may be variables in the rule header). Then, the SQL query may be expressed explicitly in terms of one or more rules, or implicitly with one or more compound keys (which may be based on one or more common nodes in a graph database). This process is shown in FIG. 11, which presents a drawing illustrating translation of a first query into an edge query.

For example, in SQL a Table may be defined as: M2M, column a and b. Equivalently, in the graph this relationship may be expressed as: M2M(a, b): - Edge(a, 'lin', h), Edge(b, 'fin', h). Then, a SQL query select a, b from M2M, MFC (with columns a, b and c) where a='Sri', M2M.a=MFC.c becomes M2M(a, b), Equal(a, 'Sri'), MFC(a2, b2, c2), Equal(a, c2). In another example, the SQL query select a, b from M2M union select a, b from MFC may be expressed as query(a, b): - M2M(a, b), query(a, b): - MFC(a, b), query (_,_)? with a set of rules and R('Sri',_)?

Note that the translation can also be run in reverse from an edge query to a query in a different format such as SQL. For example, the initial edge query may be create view M2M(a, b), select e1.s, e2.s from edge e1, edge e2 where e1.O=e2.O, e1.P='lin' and e2.P='rin'.

Figure 12:
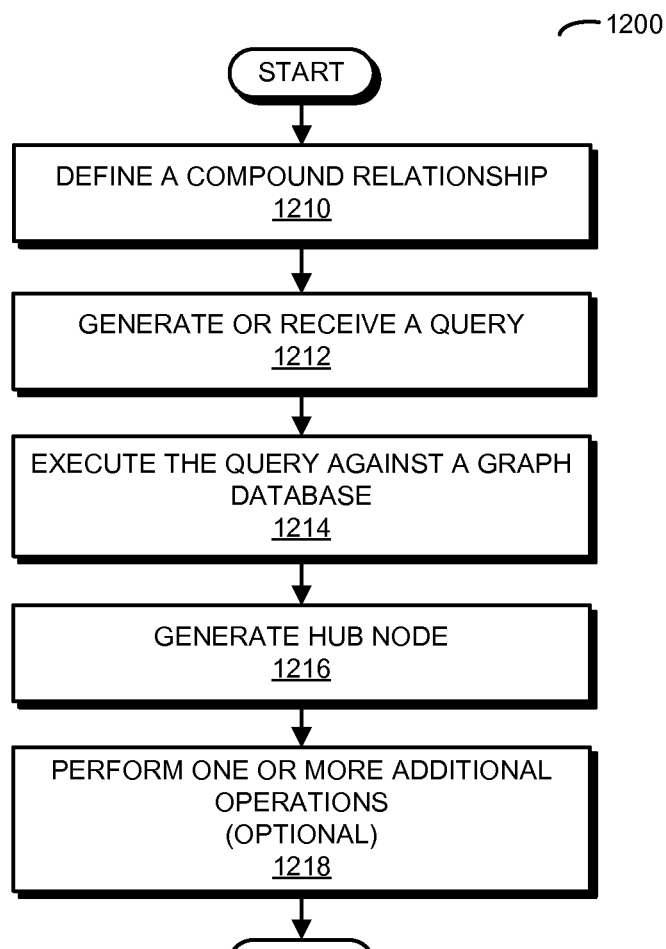
FIG. 12 is a flow chart illustrating a method for representing a compound relationship in a graph stored in a graph database in accordance with an embodiment of the present disclosure.

In some embodiments, the graph-storage technique is used to define a compound relationship. This is shown in FIG. 12, which presents a flow chart illustrating a method 1200 for representing a compound relationship in a graph stored in a graph database, which may be performed by a computer system (such as system 100 in FIG. 1 or computer system 1500 in FIG. 15). During operation, the computer system defines the compound relationship (operation 1210) based on two or more predicates associated with two or more edges between two or more nodes in the graph. (Alternatively or additionally, the user may define the compound relationship via a schema.) Then, the computer system may generate or receive a query (operation 1212) with edges that include the two or more predicates. Moreover, the computer system may execute the query against the graph database (operation 1214).

Furthermore, the computer system generates, in the graph, a hub node (operation 1216) that corresponds to the compound relationship. The identity of a hub may be determined by the incident compound edges. These edges may be visible to the user. Internally, the computer system may or may not use a different encoding of or identifier for this identity Note that the identifier of the hub node may be hidden from the users of the graph so that the identifier of the hub node is not visible external to the graph database.

Additionally, the computer system may optionally perform one or more additional operations (operation 1218). For example, the computer system may assign to the hub node a local identifier based on the two or more predicates. Moreover, as described further below with reference to FIG. 14, the computer system may add an edge associated with an identifier predicate between the hub node and a node that includes the local identifier, and/or the computer system may add an edge associated with an attribute predicate between the hub node and a node that includes an attribute of one of the two or more nodes.

(Note that the edge may only be added if it is specified in the user query. For example, suppose predicates lm and rm form a compound relation as previously specified by the user. Then --Edge(h, "lm","m1"), Edge(h, "rm","m2"), Edge(h, "score","123") may create a member-to-member connection with a score of 123. Now, if at a later time the user issues the following write --Edge(h, "lm","m1"), Edge (h, "rm","m2"), Edge(h, "score","456"), using the compound relation between "lm" and "rm" the computer system may identify the hub node as that created in the first write and may add the new "score" attribute to that hub node.)

Depending on how the attribute predicate is defined or configured, the attribute predicate can be either updated or replaced. For example, when a cardinality of the attribute predicate is greater than one, the computer system may add another edge associated with the attribute predicate between the hub node and another node that includes an updated attribute of the one of the two or more nodes. Alternatively, when the cardinality of the attribute predicate is equal to one, the computer system may replace the attribute with the updated attribute of the one of the two or more nodes.

Figure 13:
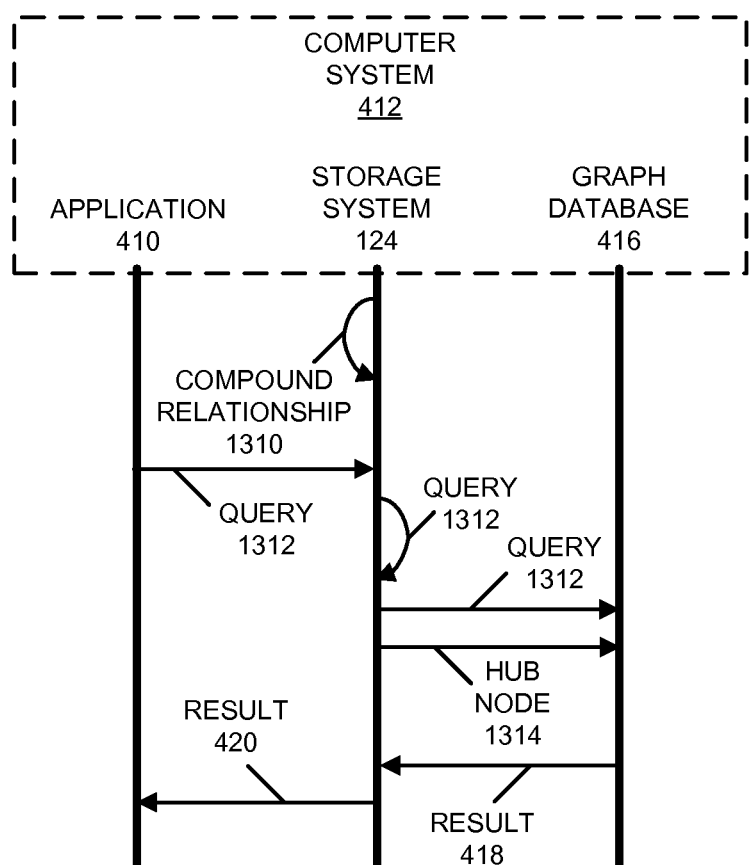
FIG. 13 is a drawing illustrating interaction with a graph database in the system of FIG. 1 in accordance with an embodiment of the present disclosure.

In an exemplary embodiment, method 1200 is implemented using one or more applications and a storage system (or engine) in the computer system that interact with each other. This is illustrated in FIG. 13. During this method, storage subsystem 124 may define compound relationship 1310 in graph database 416 based on the two or more predicates.

Then, application 410 executing in computer system 412 may provide a query 1312 to storage subsystem 124. Alternatively, storage subsystem 124 may generate query 1312 (e.g., based on desired information requested by application 410) or may translate an initial query received from application 410 (which may be in a different language that is not compatible with graph database 416) into query 1312 (which is an edge query that is compatible with graph database 416).

Next, storage subsystem 124 may execute query 1312 against graph database 416 to obtain result 418 (which may include a subset of a graph stored in graph database 416). Moreover, storage subsystem 124 may generate, in a graph stored in graph database 416, a hub node 1314 that corresponds to compound relationship 1310 and that is hidden from users of the graph. Furthermore, storage subsystem 124 may provide result 420 (which may be the same as result 418 or a portion of result 418) to application 410.

In an exemplary embodiment, the graph-storage technique is used to create a compound relationship by writing to a graph database. This compound relationship may represent a relationship that includes more than one edge, such as a member-to-member connection. For example, there may be a left member edge, an anonymous or hidden identifier of hub node (which holds the sub-graph together) and a right member edge. Thus, a compound relationship may specify a group of relationships (as opposed to one relationship). Stated differently, a compound relationship may specify a relationship or multiple relationships.

Figure 14:
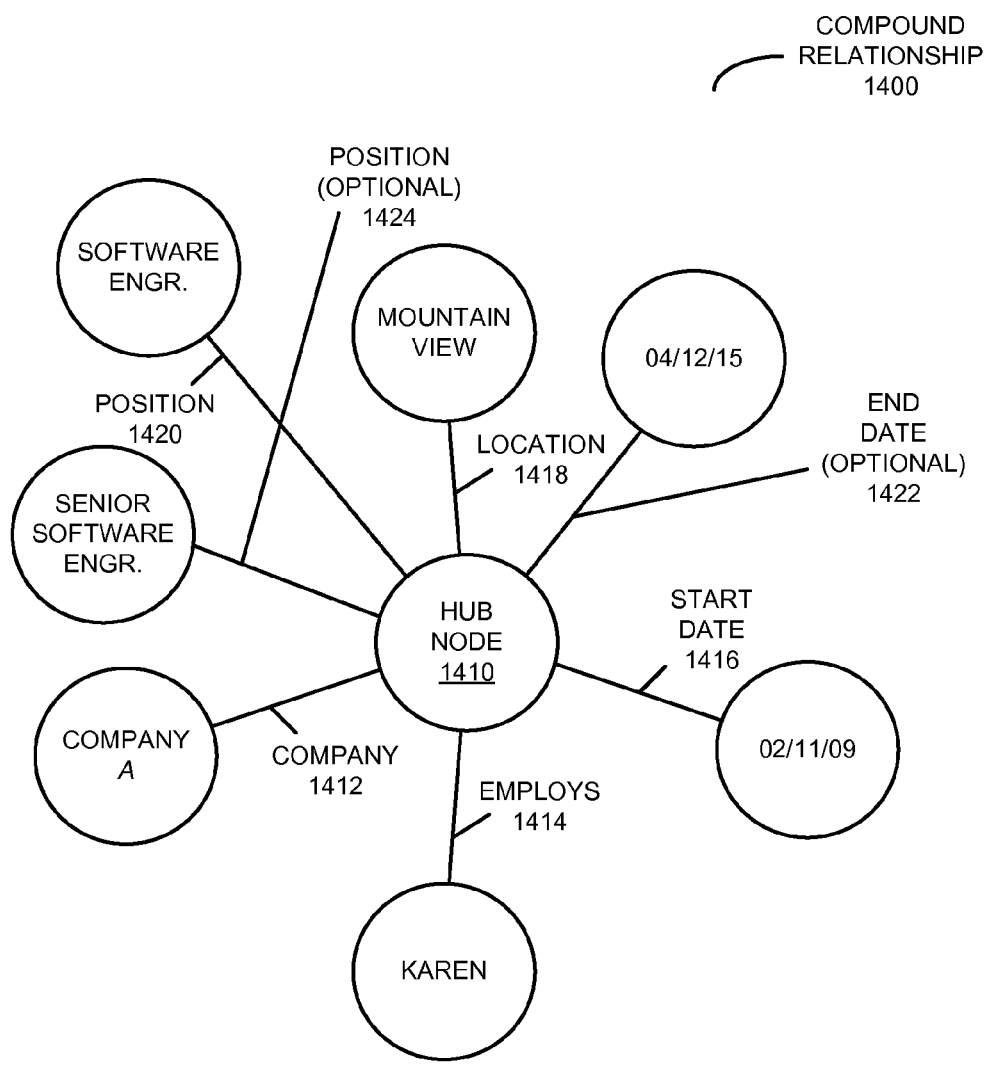
FIG. 14 is a drawing of a graph that includes a hub node that represents a compound relationship in accordance with an embodiment of the present disclosure.

FIG. 14 presents a drawing of a graph that includes a hub node 1410 that represents a compound relationship 1400. Hub node 1410 may specify the edges that uniquely define compound relationship 1400.

As shown in FIG. 14, compound relationship 1400 may specify a company-member relationship based on pre-defined predicates (a schema) that specify edges from a subject to an object. For example, the predefined predicates may include: company 1412 predicate, employs 1414 predicate, start date 1416 predicate and optional end date 1422 predicate. In addition, compound relationship 1400 may include attributes or characteristics, such as location 1418 attribute and position 1420 attribute. Note that in this example 'location' and 'position' may not be part of the compound relation because they do not give identity to the relation. In general, the attributes or characteristics may change. Thus, as described below, depending on the cardinality, position 1420 predicate may be replaced or compound relationship 1400 may be updated with an edge from hub node 1410 to optional position 1424 attribute. In this way, instead of duplicating the graph when the employee's position changes, compound relationship 1400 can be revised.

Instead of defining a global identifier for hub node 1410 (which may not scale well and may require multiple read queries prior to writing to the graph), a temporary identifier may be generated when a write operation specifies the multiple predicates associated with hub node 1410. For example, as shown in Table 5, when a compound relationship may be defined by a set of commands. Alternatively, if the user specified a compound relationship in a schema, the schema information and incoming writes may be used to generate a compound identifier for node h. This is shown in Table 6, and the computer system may use these writes to generate a compound identifier as {company: Company A, start date: 0/2/11/09, employee: Karen}, i.e., based on three predicates.

TABLE 5

Edge(r, "compound_subject", "company"),
Edge(r, "compound_subject", "start date"),
Edge(r, "compound_subject", "employee").
...

TABLE 6

Edge(h, "company", "Company A")
Edge(h, "start date", "02/11/09")
Edge(h, "employee", "Karen")
Edge(h, "position", "Software Engineer")
...

Because the compound node h is hidden (and is identified by the compound identifier), there may not be a change in how a user queries information from the graph database (i.e., the query may include the first three edges shown in Table 6). Thus, the compound relationship may provide a convenient way to represent relationships in the graph database without the user needing to know that the compound relationship and/or the identifier of the hub node.

In some embodiments, in addition to defining a compound relationship using multiple predicates, there is metadata. This metadata may include subject metadata (such as a type of node and a cardinality) and/or object metadata (such as a type of node and a cardinality). For example, an individual may only be employed by one company in a compound relationship, so the cardinality of the company may be one. However, multiple individuals may start working on the same start date, so the cardinality of the start date may be infinite.

In some embodiments, the graph database includes different types of compound relationships. An edge compound relationship may be mutable, so that edges in the edge compound relationship can be added or removed, and more generally the edge compound relationship can be deleted. (However, an edge that specifies an identifier may not be added or removed.) A literal compound relationship may be immutable. The content of the literal compound relationship may not be changed, and the literal compound relationship may only be deleted if no other entity absorbs the relationship specified by the literal compound relationship. For example, the location (latitude and longitude) of the building a company is based in may be included in a literal compound relationship. This literal compound relationship may only be deleted if another company is based in the building.

In some embodiments of methods 300 (FIGS. 3 and 4), 500 (FIG. 5), 700 (FIG. 7), 900 (FIGS. 9 and 10), and 1200 (FIGS. 12 and 13) there may be additional or fewer operations. Moreover, the order of the operations may be changed, and/or two or more operations may be combined into a single operation.

Figure 15:
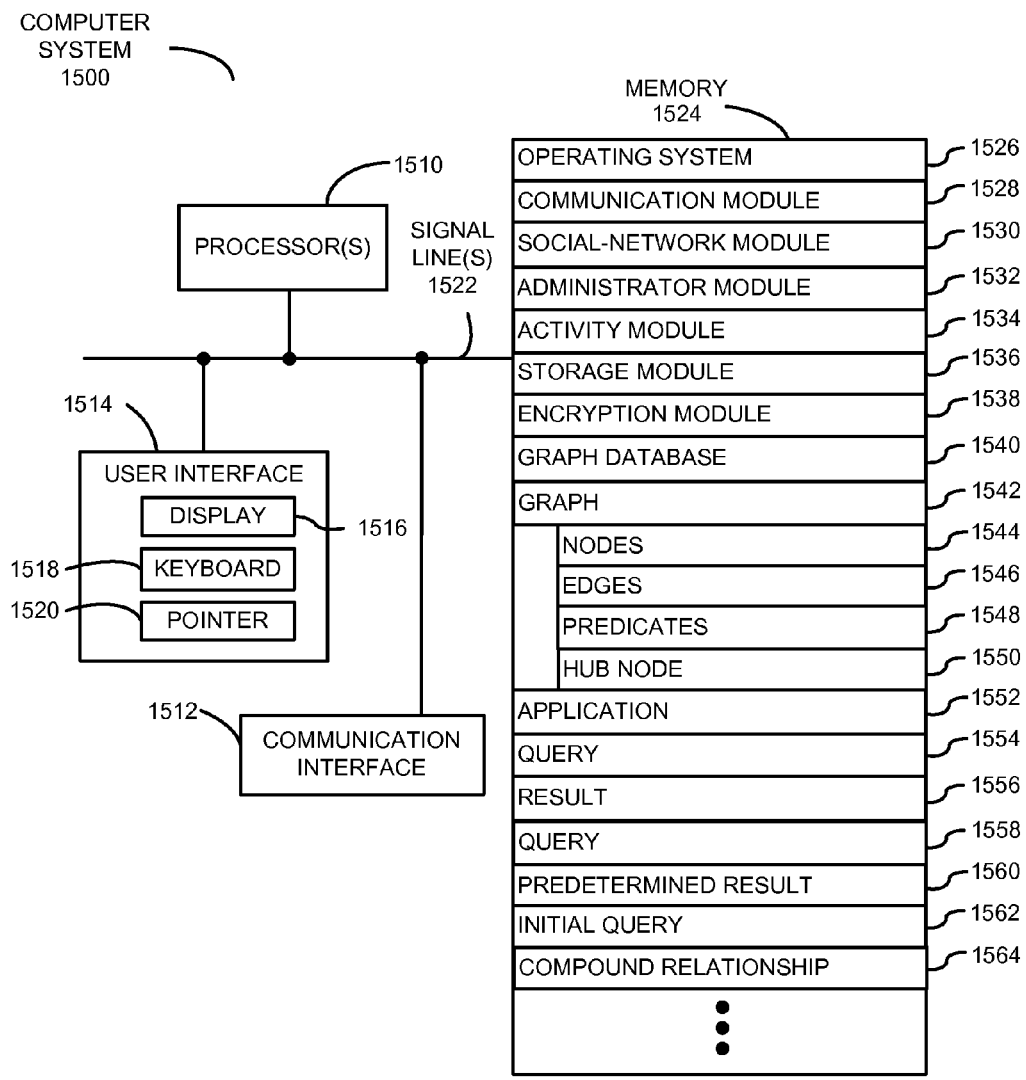
FIG. 15 is a block diagram illustrating a computer system that performs the methods of FIGS. 3, 5, 7, 9 and 12 in accordance with an embodiment of the present disclosure.

We now describe embodiments of a computer system for performing the graph-storage technique and its use. FIG. 15 presents a block diagram illustrating a computer system 1500 that performs methods 300 (FIGS. 3 and 4), 500 (FIG. 5), 700 (FIG. 7), 900 (FIGS. 9 and 10), and 1200 (FIGS. 12 and 13), such as system 100 in FIG. 1. Computer system 1500 includes one or more processing units or processors 1510 (which are sometimes referred to as 'processing modules'), a communication interface 1512, a user interface 1514, memory 1524, and one or more signal lines 1522 coupling these components together. Note that the one or more processors 1510 may support parallel processing and/or multi-threaded operation, the communication interface 1512 may have a persistent communication connection, and the one or more signal lines 1522 may constitute a communication bus. Moreover, the user interface 1514 may include: a display 1516 (such as a touchscreen), a keyboard 1518, and/or a pointer 1520 (such as a mouse).

Memory 1524 in computer system 1500 may include volatile memory and/or non-volatile memory. More specifically, memory 1524 may include: ROM, RAM, EPROM, EEPROM, flash memory, one or more smart cards, one or more magnetic disc storage devices, and/or one or more optical storage devices. Memory 1524 may store an operating system 1526 that includes procedures (or a set of instructions) for handling various basic system services for performing hardware-dependent tasks. Memory 1524 may also store procedures (or a set of instructions) in a communication module 1528. These communication procedures may be used for communicating with one or more computers and/or servers, including computers and/or servers that are remotely located with respect to computer system 1500.

Memory 1524 may also include multiple program modules, including: social-network module 1530, administrator module 1532, activity module 1534, storage module 1536, and/or encryption module 1538. Note that one or more of these program modules (or sets of instructions) may constitute a computer-program mechanism, i.e., software.

During operation of computer system 1500, users of a social network facilitated by social-network module 1530 may set up and manage accounts using administrator module 1532. Moreover, social-network module 1530 may facilitate interactions among the users via communication module 1528 and communication interface 1512. These interactions may be tracked by activity module 1534, such as viewing behavior of the users when viewing documents (and, more generally, content) provided in the social network that is implemented using social-network module 1530.

Storage module 1536 may store data associated with the social network in a graph database 1540 that stores a graph 1542 with nodes 1544, edges 1546 and predicates 1548. When storage module 1536 receives a query 1554 from an application 1552, storage module 1536 may execute query 1554 against graph database 1540 to obtain results 1556, which may include a subset of graph 1542. Moreover, storage module 1536 may execute a subsequent query 1558 against results 1556 instead of graph 1542. Note that storage module 1536 may verify results 1556 by comparing at least a portion of results 1556 with an expected or predetermined (or predefined) result 1560, such as the presence of one or more of edges 1546 based on one or more of predicates 1548 in query 1554.

In some embodiments, storage module 1536 translates an initial query 1562 that is received from application 1552 into query 1554 using one or more rules or one or more compound keys before executing query 1554 against graph database 1540. For example, initial query 1562 may be associated with another type of database than graph database 1540, and query 1554 may be an edge query.

Additionally, storage module 1536 may represent a compound relationship 1564 in graph database 15340 by defining an identifier of a hub node 1550 using two or more of edges 1546.

Because information in computer system 1500 may be sensitive in nature, in some embodiments at least some of the data stored in memory 1524 and/or at least some of the data communicated using communication module 1528 is encrypted using encryption module 1538.

Instructions in the various modules in memory 1524 may be implemented in a high-level procedural language, an object-oriented programming language, and/or in an assembly or machine language. Note that the programming language may be compiled or interpreted, e.g., configurable or configured, to be executed by the one or more processors.

Although computer system 1500 is illustrated as having a number of discrete items, FIG. 15 is intended to be a functional description of the various features that may be present in computer system 1500 rather than a structural schematic of the embodiments described herein. In practice, and as recognized by those of ordinary skill in the art, the functions of computer system 1500 may be distributed over a large number of servers or computers, with various groups of the servers or computers performing particular subsets of the functions. In some embodiments, some or all of the functionality of computer system 1500 is implemented in one or more application-specific integrated circuits (ASICs) and/or one or more digital signal processors (DSPs).

Computer systems (such as computer system 1500), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 1500 may include fewer components or additional components. Moreover, two or more components may be combined into a single component, and/or a position of one or more components may be changed. In some embodiments, the functionality of system 100 (FIG. 1) and/or computer system 1500 may be implemented more in hardware and less in software, or less in hardware and more in software, as is known in the art.

While a social network has been used as an illustration in the preceding embodiments, more generally the graph-storage technique may be used store and retrieve or query data associated with a wide variety of applications, services or systems. Moreover, the graph-storage technique may be used in applications where the communication or interactions among different entities (such as people, organizations, etc.) can be described by a social graph. Note that the people may be loosely affiliated with a website (such as viewers or users of the website), and thus may include people who are not formally associated (as opposed to the users of a social network who have user accounts). Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the graph-storage technique may be used to expand the quality of interactions and value-added services among relevant or potentially interested people in a more loosely defined group of people.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for requesting desired information from a graph database storing a graph, the method comprising:
receiving an initial query that is compatible with a first type of database that is different from the graph database;
converting the initial query into a query using primitives, wherein the primitives comprise:
a rule, based on edges in the graph, that expresses a relational schema in the first type of database, and
information associated with a compound key that specifies a relationship between nodes, edges and predicates in the graph corresponding to a table in the first type of database;
executing the query against the graph database, wherein:
the graph comprises nodes, edges between the nodes, and predicates to represent and store data with index-free adjacency; and
the query identifies a first edge associated with a predicate that specifies one or more of the nodes in the graph; and
receiving a result in response to the query, wherein the result includes a subset of the graph.

2. The method of claim 1, wherein the method further comprises generating the query with a subject, a predicate and an object based on the desired information.

3. The method of claim 2, wherein the query is associated with entities in a professional network.

4. The method of claim 1, wherein the type of database includes one of: a relational database, and a hierarchical database.

5. The method of claim 1, wherein the method further comprises:
receiving another query that is compatible with JavaScript Object Notation; and
converting the other query into the query.

6. The method of claim 1, wherein the subset of the graph includes the desired information expressed within an associated structure of the graph.

7. The method of claim 1, wherein the result excludes hierarchical constraints and relational constraints.

8. The method of claim 1, wherein the query includes a string.

9. The method of claim 1, wherein the query includes a variable.

10. The method of claim 1, further comprising:
executing a second query against the result; and
receiving a second result in response to the second query, wherein the second result includes a second subset of the graph.

11. An apparatus, comprising:
one or more processors;
memory; and
a program module, wherein the program module is stored in the memory and, during operation of the apparatus, is executed by the one or more processors to request desired information from a graph database storing a graph, the program module including:
 instructions for receiving an initial query that is compatible with a first type of database that is different from the graph database;
 instructions for converting the initial query into a query using primitives, wherein the primitives comprise:
  a rule, based on edges in the graph, that expresses a relational schema in the first type of database, and information associated with a compound key that specifies a relationship between nodes, edges and predicates in the graph corresponding to a table in the first type of database;
 instructions for executing the query against the graph database, wherein:
  the graph comprises nodes, edges between the nodes, and predicates to represent and store data with index-free adjacency; and
  the query identifies a first edge associated with a predicate that specifies one or more of the nodes in the graph; and
 instructions for receiving a result in response to the query, wherein the result includes a subset of the graph.

12. The apparatus of claim 11, wherein the program module further comprises instructions for generating the query with a subject, a predicate and an object based on the desired information.

13. The apparatus of claim 11, wherein the type of database includes one of: a relational database, and a hierarchical database.

14. The apparatus of claim 11, wherein the program module further comprises instructions for:
receiving another query that is compatible with JavaScript Object Notation; and
converting the other query into the query.

15. The apparatus of claim 11, wherein the subset of the graph includes the desired information expressed within an associated structure of the graph.

16. The apparatus of claim 11, wherein the result excludes hierarchical constraints and relational constraints.

17. The apparatus of claim 11, wherein the query includes a string.

18. The apparatus of claim 11, wherein the query includes a variable.

19. The apparatus of claim 11, wherein the program module further comprises instructions for:
executing a second query against the result; and
receiving a second result in response to the second query, wherein the second result includes a second subset of the graph.

20. A system, comprising:
a processing module comprising a non-transitory computer readable medium storing instructions that, when executed, cause the system to:
 receive an initial query that is compatible with a first type of database that is different from a graph database storing a graph;
 convert the initial query into a query using primitives, wherein the primitives comprise:
  a rule, based on edges in the graph, that expresses a relational schema in the first type of database, and information associated with a compound key that specifies a relationship between nodes, edges and predicates in the graph corresponding to a table in the first type of database;
 execute the query against the graph database, wherein:
  the graph comprises nodes, edges between the nodes, and predicates to represent and store data with index-free adjacency; and
  the query identifies a first edge associated with a predicate that specifies one or more of the nodes in the graph; and
 receive a result in response to the query, wherein the result includes a subset of the graph.

* * * * *